UNITED STATES PATENT OFFICE.

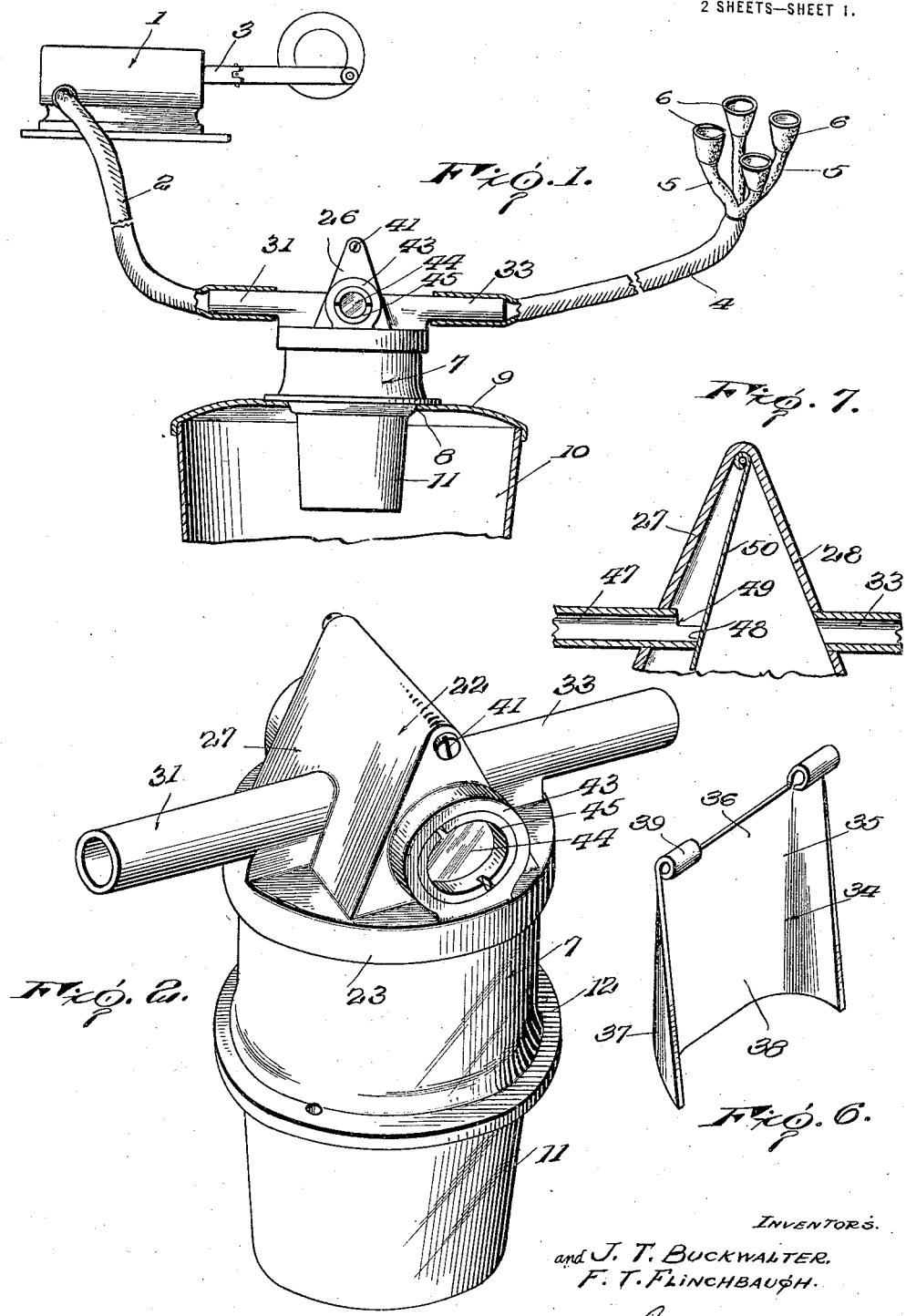

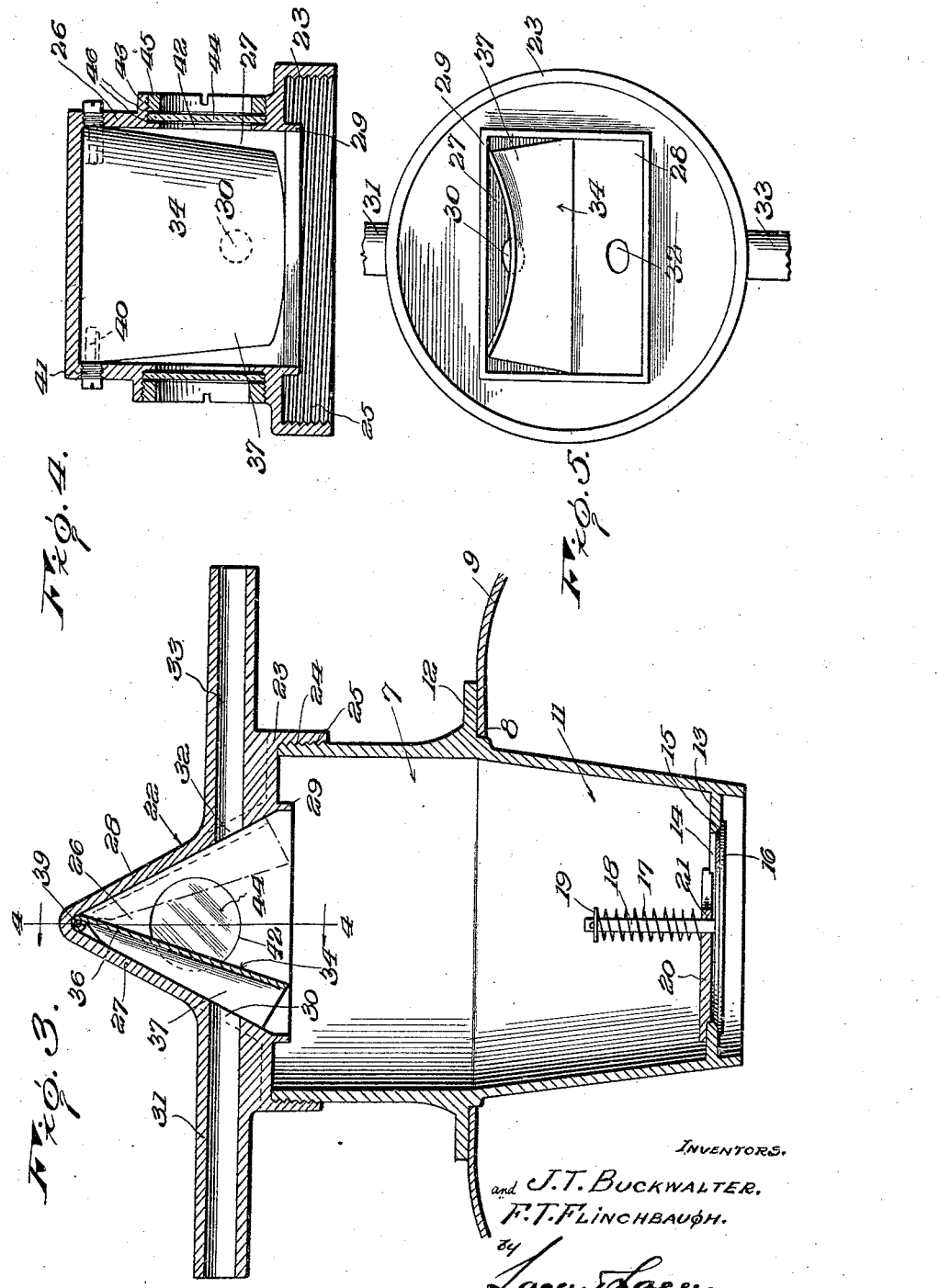

JOHN T. BUCKWALTER, OF LANCASTER, AND FREDERICK T. FLINCHBAUGH, OF YORK, PENNSYLVANIA; SAID FLINCHBAUGH ASSIGNOR TO SAID BUCKWALTER.

VALVE FOR MILKING MACHINES.

1,416,166.   Specification of Letters Patent.   Patented May 16, 1922.

Application filed January 7, 1920. Serial No. 349,853.

*To all whom it may concern:*

Be it known that we, JOHN T. BUCKWALTER and FREDERICK T. FLINCHBAUGH, citizens of the United States, residing at Lancaster and York, respectively, in the counties of Lancaster and York, respectively, and State of Pennsylvania, have invented certain new and Useful Improvements in Valves for Milking Machines, of which the following is a specification.

This invention relates to valves for milking machines and more particularly to an improvement in the valve which controls the fluid inlet port through which the milk is admitted to the receiving chamber before being discharged into the pail or other receptacle and the valve is more especially designed for use in connection with a milking machine of that type in which air is first exhausted from a receiving chamber fitted in the cover of the pail so as to draw the milk, and then admitted to the said chamber under pressure so as to discharge the milk from the said chamber and into the pail. One of the primary objects of the present invention is to provide a valve which will constitute also a deflector for the purpose of deflecting the inflowing stream of milk downwardly into the receiving chamber and thus preventing it being discharged into the air port from which it might be drawn into the pump of the machine.

Another object of the invention is to provide a combined valve and deflector for the purpose stated which will be entirely automatic in its operation and free from mechanical connection with the pumping mechanism, the valve being actuated solely by the entrance and exit of air through the air port of the valve casing.

Another object of the invention is to so construct the valve that when in position to admit the milk into the receiving chamber and to act as a deflector, it will not in any way obstruct the air port of the valve casing and consequently will not interfere with the exhaustion of air from the receiving chamber.

Another object of the invention is to so construct the valve that it may be readily cleaned and therefore kept in a sanitary condition.

Another object of the invention is to so construct the valve casing that the operation of the valve may be readily observed from the exterior of the casing and thus enable the operator of the milking machine to determine whether or not the valve is properly working.

In the accompanying drawings:

Figure 1 is a side elevation of the valve embodying the present invention, the view illustrating the manner in which the valve is to be employed;

Fig. 2 is a perspective view of the valve;

Fig. 3 is a vertical longitudinal sectional view through the valve;

Fig. 4 is a vertical transverse sectional view on the line 4—4 of Fig. 3 looking in the direction indicated by the arrows;

Fig. 5 is a bottom plan view of the valve casing removed from the receiving chamber of the device;

Fig. 6 is a perspective view of the valve proper removed from its casing.

Fig. 7 is a view similar to Fig. 3 illustrating a modified form of the invention.

In the drawings the numeral 1 indicates in general the pump of the milking apparatus and 2 the air pipe which leads from the pump, the piston of the pump, indicated by the numeral 3, being reciprocated in any suitable manner to alternately create a suction of air through the tube 2 and force air under pressure therethrough. The numeral 4 indicates the milk conducting tube from which lead the branches 5 terminating in the teat cups 6, the milk drawn from the cow being conducted through this tube to the milk intake of the device embodying the present invention and which device is indicated in general by the numeral 7 and is disposed to seat within an opening 8 formed in the cover 9 of a pail which is indicated by the numeral 10 and into which latter the milk is to be finally discharged.

The device embodying the present invention includes in its structure a receiving chamber which is indicated in general by the numeral 11 and is provided with a circumscribing flange 12 located between its upper and lower ends and designed to rest upon the portion of the pail cover 9 which surrounds the opening 8, the lower portion of the receiving chamber extending downwardly into the pail through the said opening in the cover. The receiving chamber 11 is open at its upper end except for the base of the valve casing which is fitted thereto as will be presently explained, and the said chamber is provided in its lower end with a bottom 13 having a central opening 14 surrounded by a valve seat 15. A valve 16 is yieldably held to the seat 15 to close the openings 14 by means of a spring 17 fitted onto the stem 18 of the valve and bearing at one end against a stop 19 at the upper end of the stem and at its lower end against a spider 20, through a central opening 21 in which the valve stem is slidably fitted, this spider being supported at the ends of its arms upon the upper side of the bottom 13 and spanning the opening 14. By reference to Fig. 3 of the drawings it will be evident that the valve 16 is to open in a downward direction against the tension of the spring 17, it being normally held closed by the said spring. It will further be evident that milk discharged into the receiving chamber will be retained therein until the said valve opens whereupon the milk will be discharged through the opening 14 into the pail 10.

The valve casing of the device is indicated in general by the numeral 22 and the same comprises a base 23 which is circular and provided with a depending annular flange 24 interiorly threaded as at 25 and fitted removably onto the open upper end of the receiving chamber 11. The casing proper comprises oppositely located vertically disposed parallel walls 26 and oppositely disposed walls 27 and 28 which extend between the side walls 26 and which are located in planes inclined upwardly toward each other, the walls 27 and 28 being integrally connected at their upper ends. Thus the casing is given the general form of a pyramidal prism although if desired it may take some other form. The casing is open at its bottom, and the base 23 is formed upon its under side with a depending flange 29 which surrounds the open bottom of the casing. An air port 30 is formed in the wall 27 and communicates with the inner end of a pipe fitting 31 which projects outwardly from the said wall, and a fluid inlet port 32 is formed in the wall 28 at a point opposite the port 30 and is in communication with the inner end of a pipe fitting 33 which projects outwardly from the said wall 28. The tubes 2 and 4 are respectively fitted onto the pipe fittings 31 and 33 as will be evident by referring to Fig. 1 of the drawings.

The valve proper is most clearly shown in Fig. 6 of the drawings and is indicated in general by the numeral 34 and the said valve comprises a body 35 preferably of sheet metal, the body being approximately flat at its extreme upper end as indicated by the numeral 36 and from this portion to its lower end being curved transversely in gradually increasing degree so that below its portion 36 the body has one of its faces, indicated by the numeral 37, of transversely convex form, and its other face, indicated by the numeral 38 of transversely concave form. At its upper end the body is formed at its opposite corners with pintle lugs 39, and these lugs receive the pintle ends 40 of pivot screws 41 which are threaded through the side walls 26 of the valve casing at the extreme upper end thereof, the valve proper being in this manner suspended for swinging movement. The valve is so arranged that its convex face 37 is presented toward the wall 28 of the valve casing and its concave face 38 is presented toward the wall 37 of the said casing. When the valve is in the position shown in Figs. 3 and 5 of the drawings its lateral edges will rest snugly against the inner face of the wall 27 so that the intermediate portion of the valve is considerably spaced from the wall and consequently from the port 30. In this position of the valve its convex face will serve, of course, as a deflecting surface against which milk, entering the valve casing through the port 32, may strike and thus be deflected in a downward direction. Of course, the milk is drawn into the valve casing and into the receiving chamber 11 on the suction stroke of the pump 1, the air being exhausted from the receiving chamber at such time and the valve being automatically swung to the full line position shown in Fig. 3 so as to guard the port 30 and prevent milk being discharged into this port and into the pipe fitting 31 and yet not in any way interfering with the passage of air from the receiving chamber through the said port. Each suction stroke of the pump is followed by a compression stroke and when this stroke takes place the valve will be automatically swung to the position shown in dotted lines in Fig. 3 of the drawings in which position the relatively flat portion of its face 37 will snugly contact the inner face of the wall 28 of the valve casing thus completely closing the port 32. As at this time air is being forced into the receiving chamber under pressure, the milk accumulated in the said chamber will, of course, be discharged through the opening 14, the pressure serving to automatically open the valve 16 for this purpose. At this point it will be understood that in the reciprocation of the piston of the pump to alternately exhaust air from and force air under pressure into the receiving chamber, the valve will be automatically oscillated so as to in the first instance serve as a deflector for the inflowing stream of milk and in the second instance as a closing valve for the port 32 thus preventing air which is forced into the chamber under pressure, passing through the said port and the pipe fitting 33.

In order that the operation of the valve may be readily inspected at all times, the walls 26 of the valve casing are preferably formed with oppositely located sight openings 42 and with interiorly threaded rims 43 which surround the said openings, small circular panes of glass or other transparent material 44 being disposed within the recesses provided by the rims and covering the openings 42 and being secured in place by means of ring nuts 45. Suitable packing gaskets 46 are provided at the margins of the panes 44 so as to provide a fluid-tight fit between the parts.

It will be evident that the depending flange 29 constitutes an apron which serves effectually as a means for deflecting the inflowing milk to direct the same toward the center of the valve chamber so that the milk will be deflected and discharged toward the center of the bottom of the said chamber.

In that form of the invention shown in Fig. 7 of the drawings, the air pipe 31 is replaced by a pipe 47 which extends through the wall 27 of the valve casing and has its inner end beveled or cut at an angle as indicated by the numeral 48 and its upper side cut-away as indicated by the numeral 49. In this form of the invention, a flat sided valve 50 is substituted for the transversely curved valve shown in Fig. 6 and heretofore described, it being understood by reference to the said figure that the said valve 50 when in the position shown therein will engage against the beveled end 48 of the air pipe 47 but that air may be drawn into the pipe, passing through the opening formed by cutting away the upper side of the pipe as at 49. Thus notwithstanding the employment of a flat valve instead of the curved valve heretofore described, the same results may be obtained.

It will be understood that if desired the deflecting member may be held fixedly in any suitable manner within the casing of the device although if the invention is thus modified there will, of course, be sacrificed the advantages which accrue from pivotal mounting of the said member.

Having thus described the invention, what is claimed as new is:

1. The combination with a valve casing having oppositely disposed ports, of a swinging valve flap having two opposite marginal edges turned in the same direction and towards one of the ports whereby swinging movement of said valve flap in one direction to its extreme position closes one of the ports and swinging movement in the other direction to its extreme position engages the said marginal edges with the valve casing for holding the flap spaced from the port to baffle the latter.

2. The combination with a valve casing of inverted V-shaped form in vertical cross section and having ports on opposite sides, of a swinging valve flap carried in the apex of the casing and movable to cover both of said ports, said flap having means whereby it is spaced from one of the ports when covering the same.

3. In a device of the class described, a valve casing having oppositely disposed ports, a valve suspended for swinging movement within the casing between said ports and arranged when swung toward one port to completely close the same, and means limiting the swinging movement of the valve toward the other port whereby, when so swung, it will serve as a baffle for said port without closing the same.

4. In a device of the class described, a valve casing having oppositely downwardly sloped walls and provided with ports opening through said walls at substantially opposite points, a valve suspended for swinging movement within the casing toward either of said ports and having a base arranged, when the valve is swung toward one port, to close the same, and means upon the valve limiting its swinging movement in the direction of the other port whereby in the latter position of swinging movement it will constitute a baffle for the last mentioned port without closing the same.

In testimony whereof we affix our signatures.

JOHN T. BUCKWALTER. [L. S.]
FREDERICK T. FLINCHBAUGH. [L. S.]